USOO5638785A

United States Patent [19]
Lee

[11] Patent Number: 5,638,785
[45] Date of Patent: Jun. 17, 1997

[54] VARIABLE AIR INTAKE MANIFOLD

[75] Inventor: Chun Liang Lee, Novi, Mich.

[73] Assignee: Ford Motor Company, Dearborn, Mich.

[21] Appl. No.: 731,423

[22] Filed: Oct. 15, 1996

[51] Int. Cl.$^6$ .................................................. F02M 35/10
[52] U.S. Cl. ............................ 123/184.35; 123/184.55
[58] Field of Search ......................... 123/184.35, 184.36, 123/184.48, 184.49, 184.53, 184.55

[56] References Cited

U.S. PATENT DOCUMENTS

| | | | |
|---|---|---|---|
| 4,671,217 | 6/1987 | Hitomi et al. | 123/184.53 |
| 4,945,865 | 8/1990 | Lee | 123/432 |
| 5,005,536 | 4/1991 | Suzuki et al. | 123/184.35 |
| 5,088,454 | 2/1992 | Washizu et al. | 123/184.53 |
| 5,125,369 | 6/1992 | Hitomi et al. | 123/184.53 |
| 5,309,883 | 5/1994 | Pischke | 123/397 |

FOREIGN PATENT DOCUMENTS

| | | | |
|---|---|---|---|
| 2591665 | 6/1987 | France | 123/184.53 |
| 2-136510 | 5/1990 | Japan | 123/184.36 |
| 5-1547 | 1/1993 | Japan | 123/184.35 |
| 2202276 | 9/1988 | United Kingdom | 123/184.53 |

*Primary Examiner*—David A. Okonsky
*Attorney, Agent, or Firm*—Donald A. Wilkinson

[57] ABSTRACT

An intake manifold assembly (12) for an internal combustion engine (16) which can vary the intake geometry of the air flowing therethrough. The intake manifold assembly (12) includes a pair of secondary runners (28), one for each bank of cylinders, with each of the secondary runners (28) able to selectively communicate with a small plenum (44) at its end or a large plenum (36) intermediate its ends. The intake manifold assembly (12) also includes a set of primary runners (46) able to selectively communicate with the small plenums (44) at their upstream ends or the large plenums (36) intermediate their ends. The airflow is switchable through the actuation of upper runner control valves (40) and lower runner control valves (50) to thereby vary the tuning of the intake manifold to improve the overall torque and horsepower output of the engine.

13 Claims, 3 Drawing Sheets

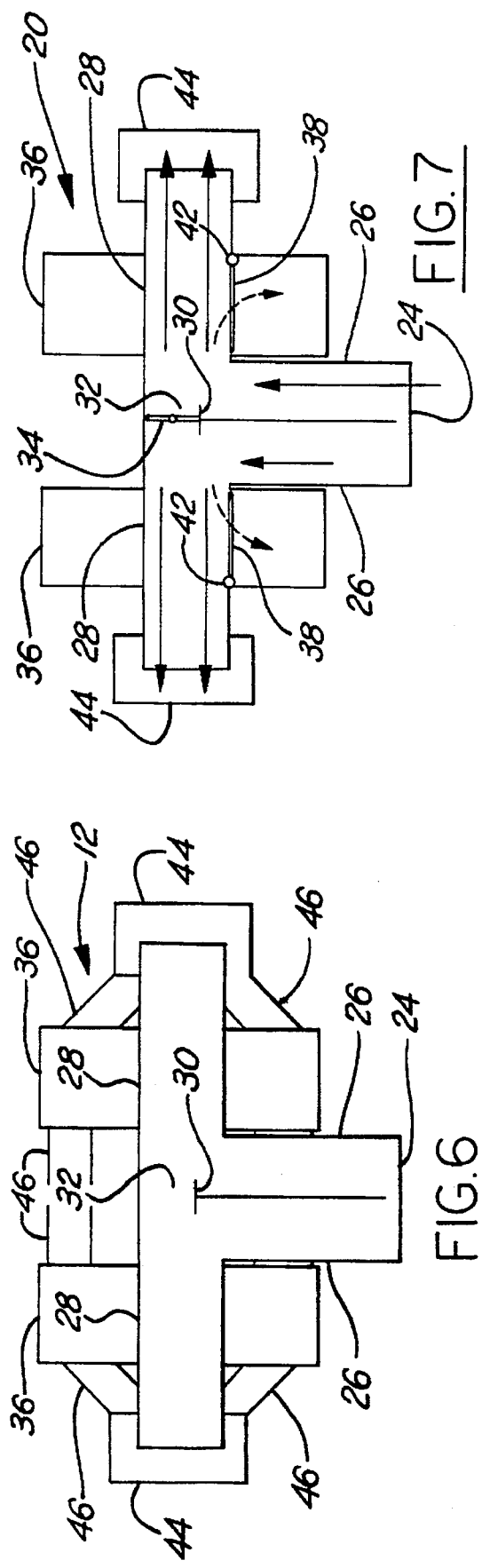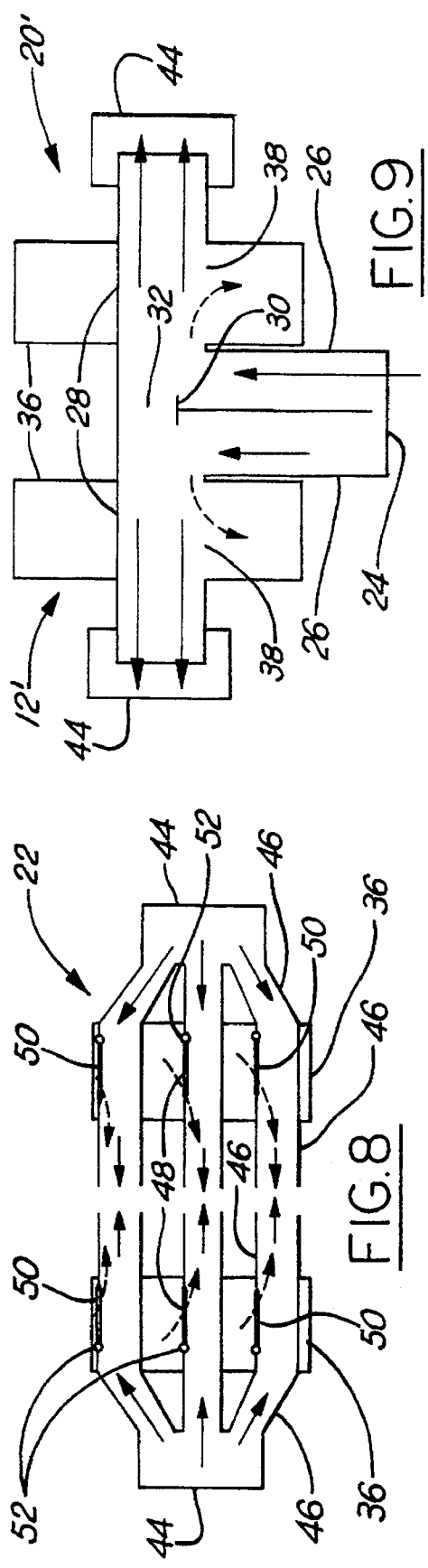

5,638,785

VARIABLE AIR INTAKE MANIFOLD

FIELD OF THE INVENTION

The present invention relates to air intake manifolds employed in motor vehicles and more particularly to air intake manifolds that have variable air flow paths to account for various engine operating conditions.

BACKGROUND OF THE INVENTION

The function of an air intake manifold for an internal combustion engine is to feed the desired amount of air to the engine combustion chamber. To maximize engine performance (torque and/or horsepower), an air intake manifold will need to be capable of delivering as much air as possible for a given size (volumetric efficiency). One conventional method consists of tuning the intake manifold based upon its acoustic characteristics. This tuning will allow the air volume to move as fast as possible at a particular engine RPM where it attains acoustic resonance at the excitation frequency caused by the pumping work of the pistons. This results in a volumetric efficiency of intake air that is more than 100% for the given engine RPM, while at other RPM ranges, the efficiency drops below 100%.

In particular, for light trucks, the engine torque at low engine RPMs is an important performance feature, with a torque curve that is flat over a wide RPM band being very desirable. However, due to the acoustic resonance of a conventional tuned air intake manifold, it is limited in the width of RPM band that can be enhanced by acoustic resonance. Two possible solutions that have been addressed recently are variable valve timing technology for intake and exhaust valves and variable intake manifold geometry where the length and/or cross-sectional area of the air passages in the manifold are varied to allow for maximum volumetric efficiency at differing engine RPMs.

For variable intake manifold designs, a typical variable intake manifold is employed with engines having two intake valves per cylinder and port throttling, which allows for the closing of one of the two intake valve ports. While this solution can work adequately for most vehicles, it can be expensive for vehicles such as light trucks, which typically have larger V-type engines with at least six cylinders and where, typically, the engines are currently configured with only one intake valve per cylinder.

In a V-type engine, a typical tuned air intake manifold design may have a common air entry point. The intake air separates into two streams, one through each secondary runner, for each bank of cylinders. The intake air for each bank then enters an intake plenum or chamber and is distributed into each of the primary runners before going into the intake ports of the cylinder heads.

In an attempt to improve on this, a variable geometry intake manifold (having more than one tuned frequency) maybe employed. It is one in which its runner lengths are switched between long and short. A longer runner length will decrease the resonant frequency of the intake manifold and increase the intake airflow speed, and consequently, the maximum volumetric efficiency of the air intake will happen at lower engine speed. This provides good engine torque at low engine speed for better stop-and-go driving conditions.

When the variable intake manifold switches its air intake passage to short runner lengths, which allows a larger overall air flow, the intake manifold's resonant frequency increases and so does the engine speed where the maximum volumetric efficiency occurs. This provides a good engine horsepower at higher engine speed for better high speed driving performance without resorting to a two intake valve per cylinder arrangement.

In order to accomplish this, a typical variable geometry intake manifold adjusts the length of the primary or secondary runner through some sort of valving. The air intake manifold is further complicated by the fact that the engine is a V-type rather than in-line.

However, a typical variable geometry air intake manifold cannot provide as much tuning as is desirable within the space available in the engine compartment. There is a need to maximize the ability to change the length of runners and the volume of the plenum through which the air flows in order to maximize the ability to vary the tuning frequency of the manifold, while still minimizing the packaging space taken up by the manifold assembly in the engine compartment of a vehicle, particularly for V-type engines.

SUMMARY OF THE INVENTION

In its embodiments, the present invention contemplates an intake manifold for use with a V-type configuration of an internal combustion engine, having two banks of cylinders. The intake manifold includes an air inlet conduit having a first end adapted to receive air from a throttle body, with the inlet conduit having a second end divided into two branches, each associated with a different one of the two banks of cylinders. The intake manifold further includes a pair of secondary runners, each one communicating with a respective one of the two branches, and a pair of large plenums, each one in communication with a respective one of the two secondary runners at a location intermediate the ends of the secondary runner. A plurality of primary runners has first and second ends, each communicating with the secondary runners at its first end and adapted to communicate with the engine cylinders at its second end, with a plurality of lower runner control valves each mounted within a respective one of the primary runners intermediate the primary runner first and second ends, and with the large plenums selectively communicable with the primary runners through the lower runner control valves.

Accordingly, an object of the present invention is to provide a combination of both variable runner lengths and variable plenum volumes in an air intake manifold for single intake valve per cylinder engines.

An advantage of the present invention is that the variable primary and secondary runner lengths and variable plenum volumes of the intake manifold improves the air intake volumetric efficiency over a wide range of engine speeds, thus improving the low speed engine torque while also maintaining or improving the maximum engine horsepower.

BRIEF DESCRIPTION OF THE DRAWINGS

FIG. 6 is a schematic plan view of the intake manifold assembly;

FIG. 7 is a schematic plan view of the upper portion of the intake manifold, indicating air flow paths through the upper portion, with control valves and communication valve closed;

FIG. 8 is a schematic plan view of the lower portion of the intake manifold, indicating air flow paths through the lower portion, with control valves closed; and FIG. 9 is a schematic plan view, similar to FIG. 7, of an alternate embodiment of the upper portion of the intake manifold, indicating air flow paths with the control valves closed and communication valve open, in accordance with the present invention.

DETAILED DESCRIPTION OF THE PREFERRED EMBODIMENTS

Figure 1:
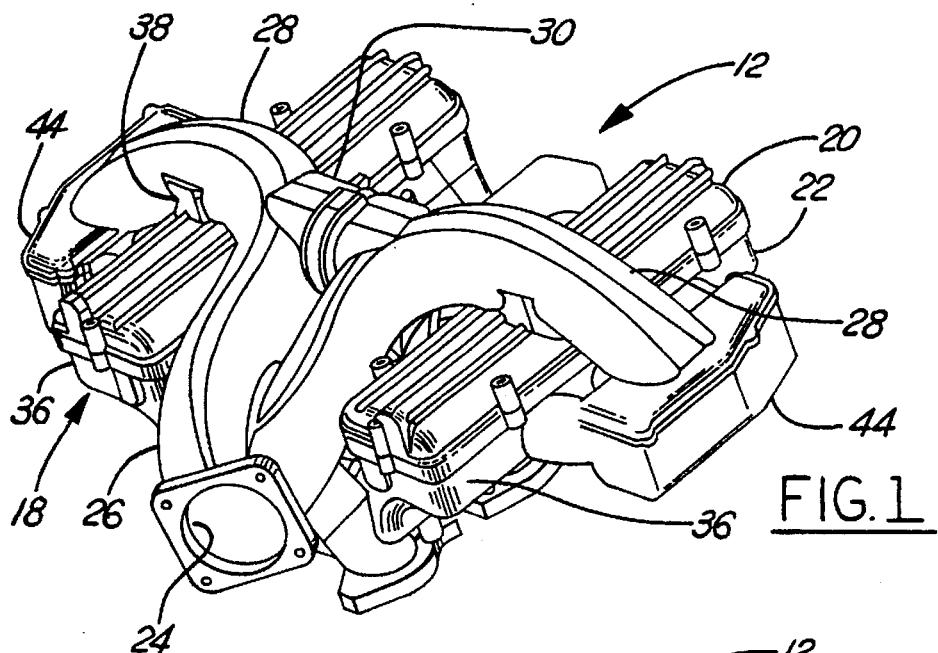
FIG. 1 is a perspective view of an intake manifold assembly in accordance with the present invention.
Figure 2:
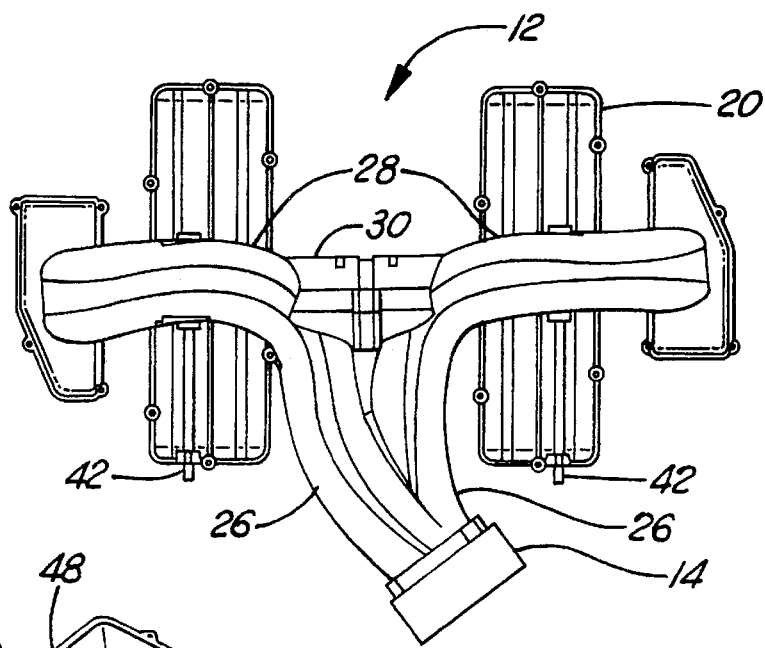
FIG. 2 is a plan view of an upper portion of the intake manifold assembly, with a throttle body shown schematically mounted thereon.
Figure 3:
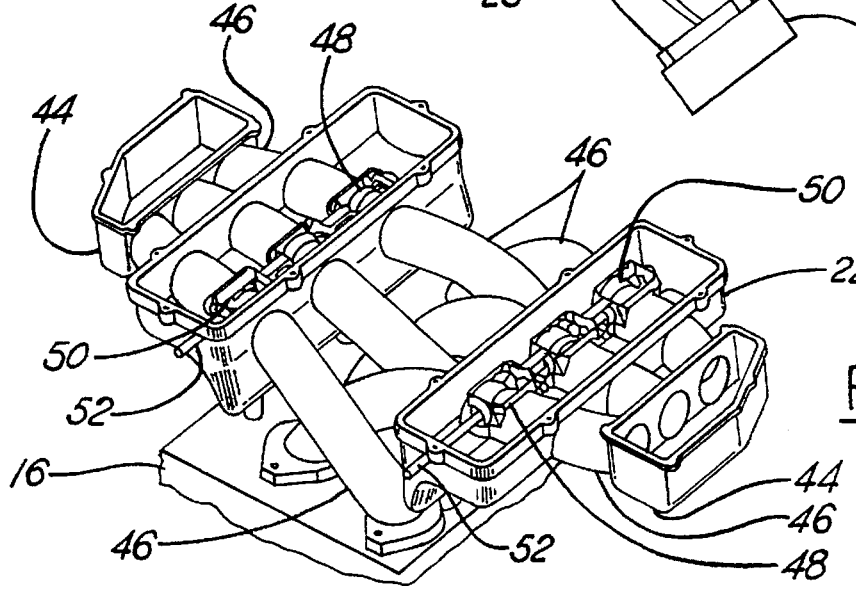
FIG. 3 is a perspective view of a lower portion of the intake manifold assembly, mounted on an engine which is shown schematically.

An air intake manifold assembly 12 is designed to receive air from a conventional throttle body 14 and distribute the air to the cylinders in a conventional V-type engine 16. The V-type configuration illustrated herein is a six cylinder engine, but engines with other numbers of cylinders can also be used. This is a plenum throttle type of arrangement as opposed to a port throttle intake design.

The manifold assembly 12 includes a housing 18 made up of an upper portion 20 and a lower portion 22. The housing portions can be made of various materials, an example being NYLON 6—6 that is formed through a lost core process. The upper portion 20 and lower portion 22 will form two subassemblies, with the two being mechanically joined by bolts or other means to allow for assembly and disassembly for repair and service.

The upper portion 20 includes an air inlet conduit 24, the upstream opening of which is connected to the throttle body 14. The air inlet conduit 24 separates into two branches 26, one for each bank of cylinders. Each branch 26 leads to a corresponding secondary runner 28. There is a communication conduit 30 extending between the two secondary runners 28, which includes a communication opening 32. A communication valve 34 is mounted within the opening 32 to selectively block the opening 32, preventing communication of air between the two secondary runners 28, when desired.

Each of the secondary runners 28 also extends over a large plenum 36, one for each bank of cylinders, the top portion of which is formed by the upper housing portion 20 and the bottom portion of which is formed by the lower housing portion 22. Each of the large plenums 36 can receive air from its associated secondary runner 28 through a valve passage 38 between the secondary runner 28 and its associated large plenum 36 from an intermediate point along the length of the secondary runner 28.

Within each valve passage 38 is an upper runner control valve 40, which can selectively block its respective opening 38, preventing communication of air between each secondary runner 28 and its associated large plenum 36. A pair of upper runner control shafts 42 are each mounted to a different one of the upper runner control valves 40, and are rotatable to actuate the valves 40. The valves are two position, opened or closed, and so do not need complex positioning mechanisms. The means by which they are actuated can be, for example, a solenoid or electric motor (not shown), as is conventionally used in engines with a port throttle deactivation. Also, since they are actuated simultaneously in order to keep balance between both banks of cylinders, a single actuation mechanism can be used, with a conventional type of linkage, gears or synchronized cables tying the two shafts 42 together.

Further, the communication valve 34, is also preferably actuated at the same time as the upper runner control valves 40 and can also be linked to the same actuator as is used for the valves 40. Since the upper and lower control valves should be closed or opened simultaneously, there is the need for only a pair of control cables actuating one pair of the control shafts, while the other pair is actuated by devices such as gears, linkages, or pulley/cable sets for synchronization.

The downstream end of each of the secondary runners 28 opens into a respective one of two small plenums 44. The small plenums 44 are smaller in internal air volume than the large plenums 36. Each small plenum 44 also connects to three primary runners 46, with each of the primary runners 46 extending to a different one of the six intake ports (not shown) in the engine 16. The three primary runners 46 for each bank of cylinders extend along the bottom of a corresponding large plenum 36.

Six lower valve passages 48, one associated with each primary runner 46, allow for communication of air between the associated large plenum 36 and primary runner 46. The lower valve passages 48 are located intermediate the length of the primary runners 46. A lower runner control valve 50 is mounted in each of the six lower valve passages 48 for selectively blocking the flow of air between the large plenum 36 and primary runners 46.

A pair of lower runner control shafts 52, one for each bank, engage each of the lower runner control valves 50 associated with its respective bank. By rotating the shafts 52, the valves 50 are caused to rotate to open or closed positions. All six lower runner control valves 50 are meant to open at the same time, and therefore, any conventional actuation mechanism used to control one of the shafts 52 can control both as discussed in relation to the upper runner control. In fact, the upper runner control valves 40 and the lower runner control valves 50 are all meant to be actuated simultaneously, and, therefore, one actuator mechanism, with a synchronization mechanism, can control all of the movement through a conventional means, as discussed above.

Figure 4:
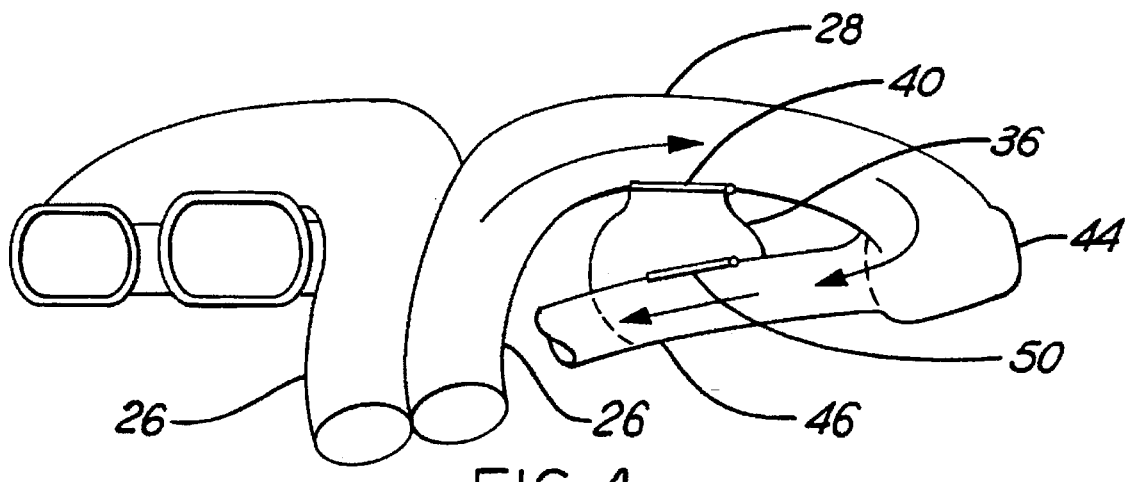
FIG. 4 is a schematic front view of a portion of the intake manifold assembly showing control valves in closed positions with airflow through long runners.

The operation of the manifold assembly 12 during engine operation will now be described. Airflow is indicated by the arrows in FIGS. 4–8, with the solid arrows indicating air flow direction in that particular view with the valves in the positions shown in that view, and dashed arrows indicating the direction of airflow if the valves were in the opposite positions from what is shown in that particular view. When the engine speed is low, for example, below 3500 to 4000 RPM, the intake air is directed through an air intake passage consisting of the full length of the secondary runners 28, the small plenums 44 and the full length of the primary runners 46 before it enters the air intake ports on the engine 16. This is accomplished by maintaining the upper runner control valves 40 and the lower runner control valves 50 in their closed positions, as is illustrated in FIG. 4. This setting optimizes the engine torque in terms of the maximum torque and the bandwidth of the useful torque.

Figure 5:
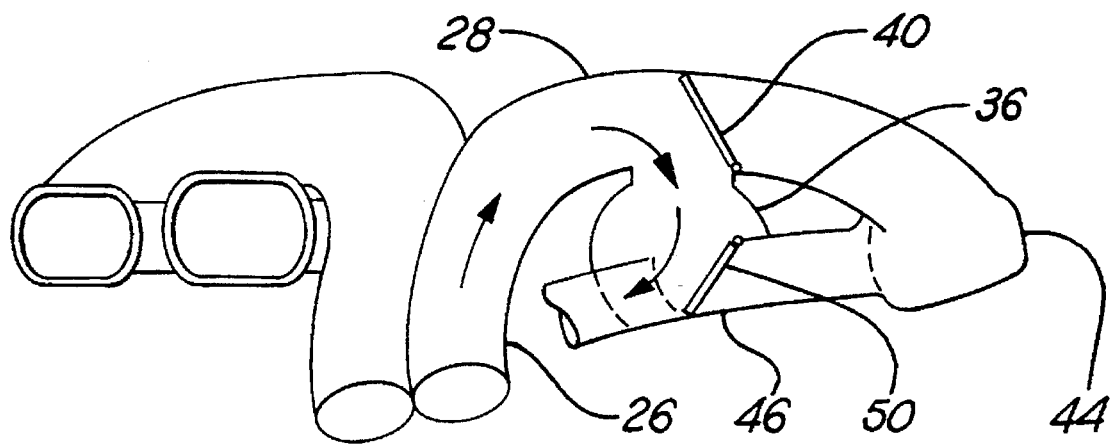
FIG. 5 is a schematic front view similar to FIG. 4, but with the runner control valves shown in open positions and air flow through short runners.

On the other hand, when the engine speed is high, for example, above 3500 to 4000 RPM, the air passage is switched to a portion of the secondary runners 28, the large plenums 36 and a portion of the primary runners 46. This is accomplished by moving the upper runner control valves 40 and the lower runner control valves 50 to their open positions, as is illustrated in FIG. 5. The communication valve 34 is primarily valuable in allowing for somewhat higher horsepower in high RPM situations, and therefore would also be opened since it provides for a somewhat higher effective volume of air to draw from for each individual cylinder. This intake passage geometry optimizes the engine horsepower that is needed at high engine speed.

This means that the intake manifold assembly 12 allows for adjustment in length of both the primary runners 46 and the secondary runners 28 as well as a change in plenum volume in order to maximize the variation, to allow for maximizing engine performance.

An alternate embodiment is illustrated in FIG. 9, which shows the upper portion 20', similar to FIG. 7. The lower portion 22, as illustrated in FIG. 8 for the first embodiment is the same for this embodiment. Elements in this embodiment which differ from corresponding elements in the first embodiment, will use the same element number, but with and added prime. This embodiment is the same as the first, with the exception that both the upper runner control valves and the communication valve are removed, along with the associated actuation hardware. The operation of the manifold assembly 12' is still basically the same since, while the air is no longer prevented from flowing into the large plenums 36 from the secondary runners 28, air cannot flow out of the large plenums 36 into the primary runners 46 unless the lower runner control valves 50 are opened.

While certain embodiments of the present invention have been described in detail, those familiar with the art to which this invention relates will recognize various alternative designs and embodiments for practicing the invention as defined by the following claims.

I claim:

1. An intake manifold for use with a V-type configuration of an internal combustion engine, having two banks of cylinders, the intake manifold comprising:

an air inlet conduit having a first end adapted to receive air from a throttle body, with the inlet conduit having a second end divided into two branches, each associated with a different one of the two banks of cylinders;

a pair of secondary runners, one each communicating with a respective one of the two branches;

a pair of large plenums, each one in communication with a respective one of the two secondary runners at a location intermediate the ends of the secondary runner; and a plurality of primary runners having first and second ends, each communicating with the secondary runners at its first end and adapted to communicate with the engine cylinders at its second end, with a plurality of lower runner control valves each mounted within a respective one of the primary runners intermediate the primary runner first and second ends, and with the large plenums selectively communicable with the primary runners through the lower runner control valves.

2. The intake manifold of claim 1 further comprising a pair of upper runner control valves, each mounted within a respective one of the secondary runners intermediate the respective ends thereof for selectively blocking the communication of air between each of the secondary runners and its respective large plenum.

3. The intake manifold of claim 2 further comprising a communication opening between the pair of secondary runners.

4. The intake manifold of claim 3 further comprising a communication valve mounted within the communication opening and selectively closable to eliminate communication of air between the pair of secondary runners.

5. The intake manifold of claim 1 further comprising a communication opening between the pair of secondary runners.

6. The intake manifold of claim 5 further comprising a communication valve mounted within the communication opening and selectively closable to eliminate communication of air between the pair of secondary runners.

7. The intake manifold of claim 6 further including a pair of small plenums, each mounted between a respective one of the two secondary runners and the corresponding primary runners, whereby air is communicated between the secondary runners and primary runners through the small plenums.

8. The intake manifold of claim 1 further including a pair of small plenums, each mounted between a respective one of the two secondary runners and the corresponding primary runners, whereby air is communicated between the secondary runners and primary runners through the small plenums.

9. An intake manifold for use with a V-type configuration of an internal combustion engine, having two banks of cylinders, the intake manifold comprising:

an air inlet conduit having a first end adapted to receive air from a throttle body, with the inlet conduit having a second end divided into two branches, each one associated with a different one of the two banks of cylinders;

a pair of secondary runners, one each communicating with a respective one of the two branches;

a pair of large plenums, each one in communication with a respective one of the two secondary runners at a location intermediate the ends of the secondary runner;

a pair of small plenums, each in communication with a respective one of the two secondary runners at the end opposite the branches; and a plurality of primary runners, each communicating with the secondary runners at a first end and adapted to communicate with the engine cylinders at a second end, with a plurality of lower runner control valves each mounted within a respective one of the primary runners and with the large plenums selectively communicable with the primary runners at a location intermediate the first and second ends of the primary runners through the lower runner control valves.

10. The intake manifold of claim 9 further comprising a pair of upper runner control valves, each mounted within a respective one of the secondary runners for selectively blocking the communication of air between the secondary runners and the large plenums.

11. The intake manifold of claim 9 further comprising a communication opening between the pair of secondary runners and a communication valve mounted within the communication opening which is selectively closable to eliminate communication of air between the pair of secondary runners.

12. An intake manifold for use with a V-type configuration of an internal combustion engine, having two banks of cylinders, the intake manifold comprising:

an air inlet conduit having a first end adapted to receive air from a throttle body, with the inlet conduit having a second end;

a pair of secondary runners, each communicating with the second end of the air inlet conduit;

a pair of large plenums, each one in communication with a respective one of the two secondary runners at a location intermediate the respective ends of each of the secondary runners;

a pair of upper runner control valves, each mounted within a respective one of the secondary runners intermediate the respective ends thereof for selectively blocking the communication of air between each of the secondary runners and its respective large plenum; and a plurality of primary runners, each communicating with the secondary runners at a first end and adapted to communicate with the engine cylinders at a second end, with a plurality of lower runner control valves each mounted within a respective one of the primary runners and with the large plenums selectively communicable with the primary runners at a location intermediate the first and second ends of the primary runners through the lower runner control valves.

13. The intake manifold of claim 12 further including a pair of small plenums, each mounted between a respective one of the two secondary runners and the corresponding primary runners, whereby air is communicated between the secondary runners and primary runners through the small plenums.

* * * * *